United States Patent
Hirunuma et al.

[11] Patent Number: 6,038,072
[45] Date of Patent: *Mar. 14, 2000

[54] BINOCULAR HAVING HAND-VIBRATION COMPENSATION SYSTEM

[75] Inventors: Ken Hirunuma, Tokyo; Shinji Tsukamoto, Saitama-ken; Moriyasu Kanai, Tokyo, all of Japan

[73] Assignee: Asahi Kogaku Kogyo Kabushiki Kaisha, Tokyo, Japan

[*] Notice: This patent is subject to a terminal disclaimer.

[21] Appl. No.: 09/203,520

[22] Filed: Dec. 1, 1998

[30] Foreign Application Priority Data

Dec. 2, 1997 [JP] Japan .................................. 9-331737

[51] Int. Cl.⁷ .............................. G02B 27/64; G02B 23/00
[52] U.S. Cl. ........................ 359/557; 359/554; 359/407; 396/52; 396/55
[58] Field of Search .................................... 359/554–557, 359/407–420, 480–482, 813–814, 823–824; 396/52–55; 348/208

[56] References Cited

U.S. PATENT DOCUMENTS

| | | | |
|---|---|---|---|
| 5,280,387 | 1/1994 | Maruyama | 359/554 |
| 5,387,999 | 2/1995 | Hayashi | 359/557 |
| 5,461,513 | 10/1995 | Maruyama | 359/837 |
| 5,754,339 | 5/1998 | Kanai et al. | 359/557 |
| 5,768,016 | 6/1998 | Kanbara | 359/557 |
| 5,798,863 | 8/1998 | Udagawa et al. | 359/557 |
| 5,917,653 | 6/1999 | Taniguchi | 359/557 |

FOREIGN PATENT DOCUMENTS

| | | |
|---|---|---|
| 2-81009 | 3/1990 | Japan . |
| 2284113 | 11/1990 | Japan . |
| 3237438 | 10/1991 | Japan . |
| 6-43365 | 2/1994 | Japan . |
| 7248522 | 9/1995 | Japan . |
| 7311368 | 11/1995 | Japan . |

*Primary Examiner*—Thong Nguyen
*Attorney, Agent, or Firm*—Greenblum & Bernstein, P.L.C.

[57] ABSTRACT

Provided is a hand-vibration compensation system for compensating trembling of images due to a hand-vibration applied to a binocular having a pair of telescopic optical systems. The hand-vibration compensation system includes first and second compensation optical systems respectively provided in the pair of telescopic optical systems. The optical axes of the pair of telescopic optical systems intersect the first and second compensation optical systems, respectively. The compensation system further includes a driving system that moves at least one optical element included in each of the first and second optical systems in opposite directions within a plane perpendicular to the optical axes of the pair of telescopic optical systems.

12 Claims, 11 Drawing Sheets

BINOCULAR HAVING HAND-VIBRATION COMPENSATION SYSTEM

BACKGROUND OF THE INVENTION

The present invention relates to binocular provided with a hand-vibration compensation system.

Recently, binoculars provided with hand-vibration compensation systems have been developed. The hand-vibration compensation system is a system for compensating trembling of image due to hand-vibration applied to the binocular.

In one example of the hand-vibration compensation system for a binocular, right and left erecting prism systems are held with use of gimbal mounts which support a free giro rotating at a high speed. In another example, a pair of variable angle prisms are inserted within optical paths of the right and left telescopic optical systems, and the angle of the prisms is changed in accordance with the hand vibration detected by an angular velocity sensor.

In the conventional compensation systems described as above, when the compensation mechanisms operate, a user of the binocular may feel an ill-balanced condition due to movement of the center of gravity and/or inertia of the mechanisms.

Further, when the user intentionally moves the binocular for panning or tilting, inertia of the compensation mechanisms may results in the opposite compensating movement thereof although it is not necessary.

Furthermore, the above-described conventional compensation mechanisms are generally large in size, requires a complicated control, and expensive. Accordingly, a hand vibration compensation system which has a simple structure, is not expensive, and does not cause the ill-balanced condition has been desired.

SUMMARY OF THE INVENTION

It is therefore an object of the present invention to provide a binocular having a hand-vibration compensation system which does not cause an ill-balanced condition, and improve an operability with a relatively simple structure.

For the above object, according to the present invention, there is provided a hand-vibration compensation system for compensating trembling of images due to a hand-vibration applied to a binocular having a pair of telescopic optical systems. The hand-vibration compensation system is provided with first and second compensation optical systems respectively provided in the pair of telescopic optical systems. The optical axes of the pair of telescopic optical systems intersect the first and second compensation optical systems, respectively. Further, the compensation system is provided with a driving system that moves at least one optical element included in each of the first and second optical systems in opposite directions within a plane perpendicular to the optical axes of the pair of telescopic optical systems.

Since the lenses are moved in the opposite directions, the center of gravity will not change, and therefore a user of the binocular may not feel an ill-balanced condition when the compensation system operates.

Optionally, when the at least one optical element included in the first compensation optical system is moved by a predetermined amount, image is shifted by an amount K1, and when the at least one optical element included in the second compensation optical system is moved by the predetermined amount, image is shifted by an amount K2, the driving system moves the at least one optical element included in the first compensation optical system by an amount D1 and the at least one optical element included in the second compensation optical system by an amount D2 such that a relationship:

$$K1:K2=D2:D1$$

is satisfied.

Accordingly, it the amounts K1 and K2 are same, the optical elements are moved by the same amount, while if the amounts K1 and K2 are different, the optical elements are moved by different amounts, respectively.

In one example, the driving system may include: an arm that is located at a center between the optical axes of the pair of telescopic optical systems, and is rotatable about an axis extending in parallel with the optical axes of the pair of telescopic optical systems, the at least one optical element included in each of the first and second compensation optical systems being held at each end of the arm; and an actuator that drives the arm to rotate about the axis in accordance with a hand-vibration applied to the binocular in a direction perpendicular to a plane including both of the optical axes of the first and second telescopic optical systems.

In this case, each of the first and second compensation optical systems may include another optical element, and the hand-vibration compensation system includes another driving system that moves the another optical element of each of the first and second compensation optical systems in a direction which is parallel to a line perpendicular to both of the optical axes of the first and second telescopic optical systems and is parallel to the plane including the optical axes of the first and second telescopic optical systems.

The another optical element of each of the first and second compensation optical systems may be moved in the same direction when the trembling of images due to the hand-vibration applied to the binocular is compensated Alternatively, the another optical element of each of the first and second compensation optical systems may be moved in an opposite direction when the trembling of images due to the hand-vibration applied to the binocular is compensated.

In another case, the driving system may be provided with: first and second frames respectively holding the at least one optical element of each of the first and second compensation optical systems, the first and second frames being movable in a direction parallel to a line which is perpendicular to both of the optical axes of the first and second telescopic optical systems and is parallel to a plane including the optical axes of the first and second telescopic optical systems; and an actuator that moves the first and second frames in accordance with a hand-vibration applied the binocular in the direction parallel to the line which is perpendicular to both of the optical axes of the first and second telescopic optical systems and is parallel to a plane including the optical axes of the first and second telescopic optical systems.

In this case, each of the first and second compensation optical systems may include another optical element, and the hand-vibration compensation system may include another driving system that moves the another optical element of each of the first and second compensation optical systems in a direction perpendicular to a plane including both of the optical axes of the first and second telescopic optical systems.

Optionally, the another optical element of each of the first and second compensation optical systems may be moved in the same direction when the trembling of images due to the hand-vibration applied to the binocular is compensated.

In one particular case, the telescopic optical systems may include objective lenses and erecting optical systems, respectively, and the first and second compensation optical systems may be provided between the objective lenses and the erecting optical systems.

In particular, the lens driving system may be provided with:

(I) a first driving mechanism, which includes:

(a) an arm that is located at a center between the optical axes of the pair of telescopic optical systems, and is rotatable about an axis extending in parallel with the optical axes of the pair of telescopic optical systems, the at least one optical element included in each of the first and second compensation lens groups being held at each end of the arm; and (b) a first actuator that moves the arm to rotate about the axis in accordance with a hand-vibration applied to the binocular in a direction perpendicular to a plane including the optical axes of the first and second telescopic optical systems; and (II) a second driving mechanism, which includes:

(a) first and second frames respectively holding another optical element of each of the first and second compensation lens groups, the first and second frames being movable in a direction parallel to a line which is perpendicular to both of the optical axes of the first and second telescopic optical systems; and (b) a second actuator that moves the first and second frames in accordance with a hand-vibration applied the binocular in a direction parallel to the line which is perpendicular to both of the optical axes of the first and second telescopic optical systems.

According to a further aspect of the invention, there is provided with a binocular having a hand-vibration compensation system for compensating trembling of images due to a hand-vibration applied to the binocular, which is provided with: a pair of telescopic optical systems; first and second compensation optical systems respectively provided in the pair of telescopic optical systems, optical axes of the pair of telescopic optical systems intersect the first and second compensation optical systems, respectively; and a driving system that moves at least one optical element included in each of the first and second optical systems in opposite directions within a plane perpendicular to the optical axes of the pair of telescopic optical systems.

DESCRIPTION OF THE ACCOMPANYING DRAWINGS

DESCRIPTION OF THE EMBODIMENTS

Hereinafter, embodiments of the present invention will be described with reference to the accompanying drawings.

First Embodiment

Figure 1:
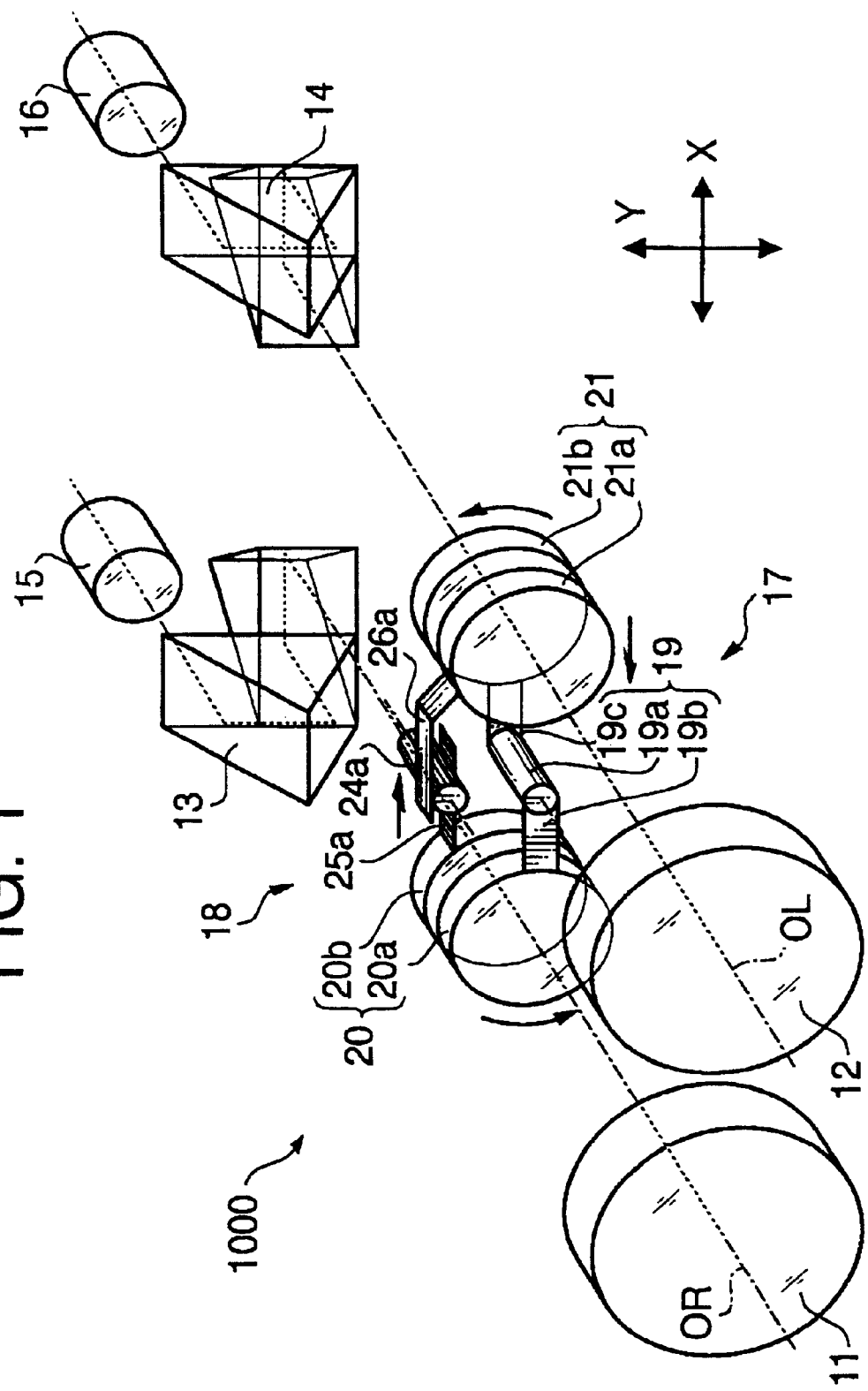
FIG. 1 is a perspective view of an optical system showing arrangement of optical elements of a binocular according to a first embodiment of the invention.

FIG. 1 shows an optical system of a binocular 1000 according to a first embodiment of the invention. The binocular 1000 is provided with a pair of telescopic optical systems for right and left eyes of a user. It should be noted that, in the accompanying drawings, an X-Y axis system is indicated to clarify the direction referred to. The Y axis corresponds to the up/down direction of the user when the binocular is held horizontally by the user, and the X axis corresponds to the right/left direction of the user of the binocular when the binocular is held horizontally.

At a front end of the telescopic optical system for the right eye (on the left-hand side in FIG. 1), a right objective lens 11 is provided, and at a front end of the telescopic optical system for the left eye (on the right-hand side in FIG. 1), a left objective lens 12 is provided. Behind each of the right objective lens 11 and the left objective lens 12, erecting optical systems 13 and 14, each of which has four reflection surfaces, are provided. In the embodiments in this specification, as the erecting optical system, a type I Porro prism system is employed. Instead of the type I system, a type II Porro prism system can also be employed.

In FIG. 1, axes OR and OL denote optical axes of right and left telescopic optical systems, respectively.

The object lenses 11 and 12 form inverted images, which are erected by the erecting optical systems 13 and 14, and then the erected images are observed through eyepiece lenses 15 and 16.

In the binocular 1000 according to the first embodiment, between the objective lens 11 and 12, and the erecting optical systems 13 and 14, an up/down hand vibration compensation mechanism 17 (hereinafter referred to as the up/down compensation mechanism) and a right/left hand vibration compensation mechanism 18 (hereinafter, referred to as the right/left compensation mechanism) are provided.

Figure 2:
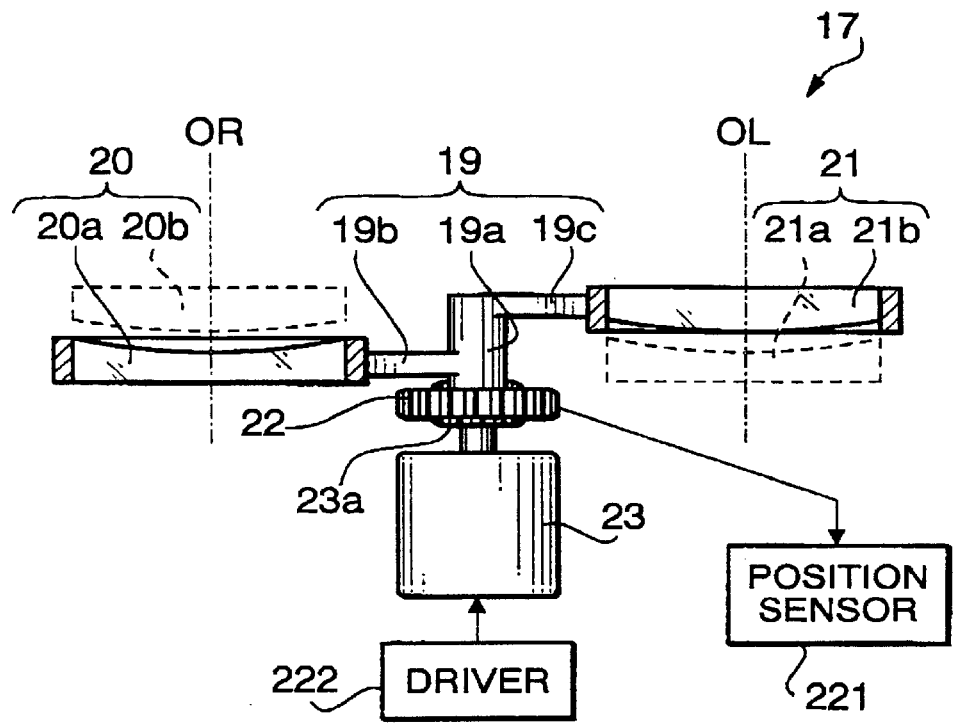
FIG. 2 is a top view showing a schematic structure of an up/down hand-vibration compensation mechanism of the binocular shown in FIG. 1.

As shown in FIG. 1, in each telescopic optical system, compensation lens 20 (21) is provided. The right and left compensation lenses 20 and 21 are arranged such that the optical axes OR and OL intersect the right and left compensation lenses 20 and 21. The compensation lens 20 includes a negative compensation lens 20a and a positive compensation lens 20b, which are arranged along the optical axis OR; and the compensation lens 21 includes a negative compensation lens 21a and a positive compensation lens 21b, which are arranged along the optical axis OL, as shown in FIG. 2. The negative lenses 20a and 21a are the same lens, and the positive lenses 20b and 21b are the same lens. Further, the lenses 20a and 21b are formed such that, when these lenses are decentered (i.e., the optical axis of the lenses 20a and 21b are moved in a direction perpendicular to the optical axes OR), the optical paths of light passed through the lenses 20a and 21b shift by the same amount but in the opposite directions.

The up/down compensation mechanism 17 includes a rotatable arm 19, which holds the right and left compensation lenses 20a and 21b (see FIG. 2). A rotating shaft 19a of the rotatable arm 19 is located at the center of both of the optical axes OR and OL of the right and left telescopic optical systems, and extends in parallel to the optical axes OR and OL. In the direction which is perpendicular to the shaft 19a, and is parallel to a plane including the optical axes OR and OL (i.e., in the X-axis direction in FIG. 1), a right compensation lens frame 19b and a left compensation lens frame 19c extend, from the shaft 19a, in opposite directions. The right compensation lens frame 19b holds the negative lens 20a, and the left compensation lens frame 19c holds the positive lens 21b. Therefore, the right compensation lens frame 19b and the left compensation lens frame 19c are apart by a predetermined amount along the optical axes OR.

The positive lens 20b and the negative lens 21a, which are not held by the rotatable arm 19, are held by a right/left hand vibration compensation mechanism, which will be described later.

Figure 3:
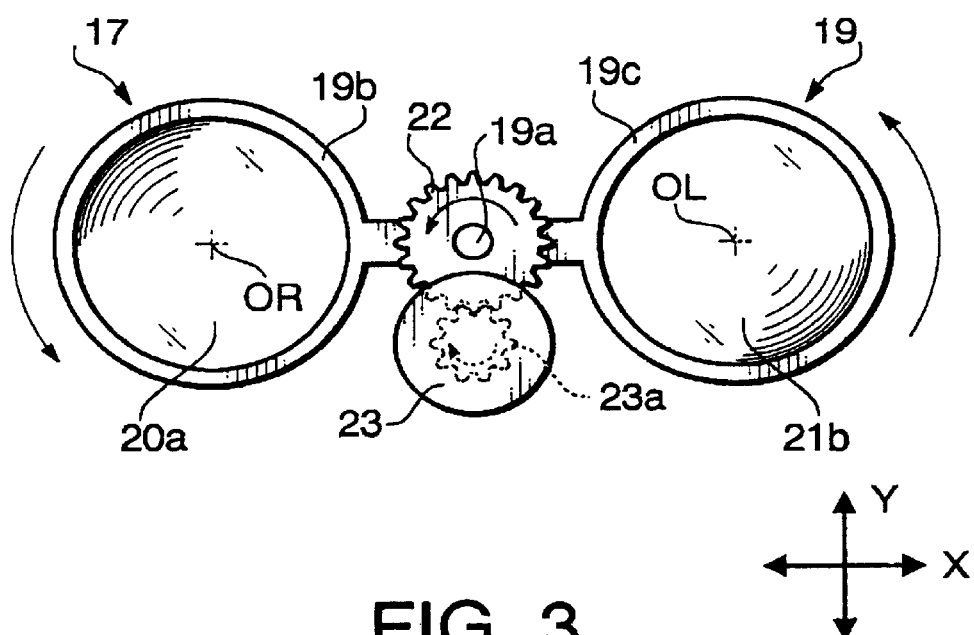
FIG. 3 is a front view showing a schematic structure of the up/down hand-vibration compensation mechanism of the binocular shown in FIG. 1.

To the front end (i.e., the object lens side end) of the shaft 19a, a driving gear 22 is secured, with which a pinion gear 23a of a motor 23 is engaged. The motor 23 is driven to rotate in either direction (i.e., in clockwise or counterclockwise direction in FIG. 3) such that the pinion gear 23a is rotated in a forward or reverse direction (i.e., in counterclockwise or clockwise direction in FIG. 3). As shown in FIG. 3, when the pinion gear 23a is rotated in the clockwise direction in the drawing, the arm 19 is driven to rotate in the counterclockwise direction about the shaft 19a, while when the pinion gear 23a is rotated in the counterclockwise direction in the drawing, the arm 19 is rotated in the clockwise direction.

As described above, by rotating the arm 19 with the motor 23, the negative lens 20a and the positive lens 21b which are arranged on the opposite positions with respect to the shaft 19a can be displaced in opposite directions within a plane perpendicular to the optical axes OR and OL of the telescopic optical systems. Since each of the negative lens 20a and the positive lens 21b moves along an arc whose center is the central axis of the shaft 19a, when the lenses 20a and 21b are displaced, the negative lens 20a and the positive lens 21b are displaced in the right/left direction (i.e., in the X-axis direction in FIG. 1) as well as in the up/down direction (i.e., in the Y-axis direction in FIG. 1). However, the amount of displacement in the right/left direction is small and can be ignored. Thus, the negative lens 20a and the positive lens 21b are moved mainly in the up/down direction (Y-axis direction in FIG. 1) when the rotatable arm 19 is rotated.

It should be noted that when the rotatable arm 19 is rotated, the negative lens 20a and the positive lens 21b are moved in the opposite directions with respect to the inverted images. However, as described above, the positions of the inverted images are shifted in the same direction.

As shown in FIG. 2, a position sensor 221 is provided to detect a rotational position of the arm 19 with respect to its initial position, at which the optical axes of the lenses 20a and 21b coincide with the optical axes OR and OL.

Figure 4:
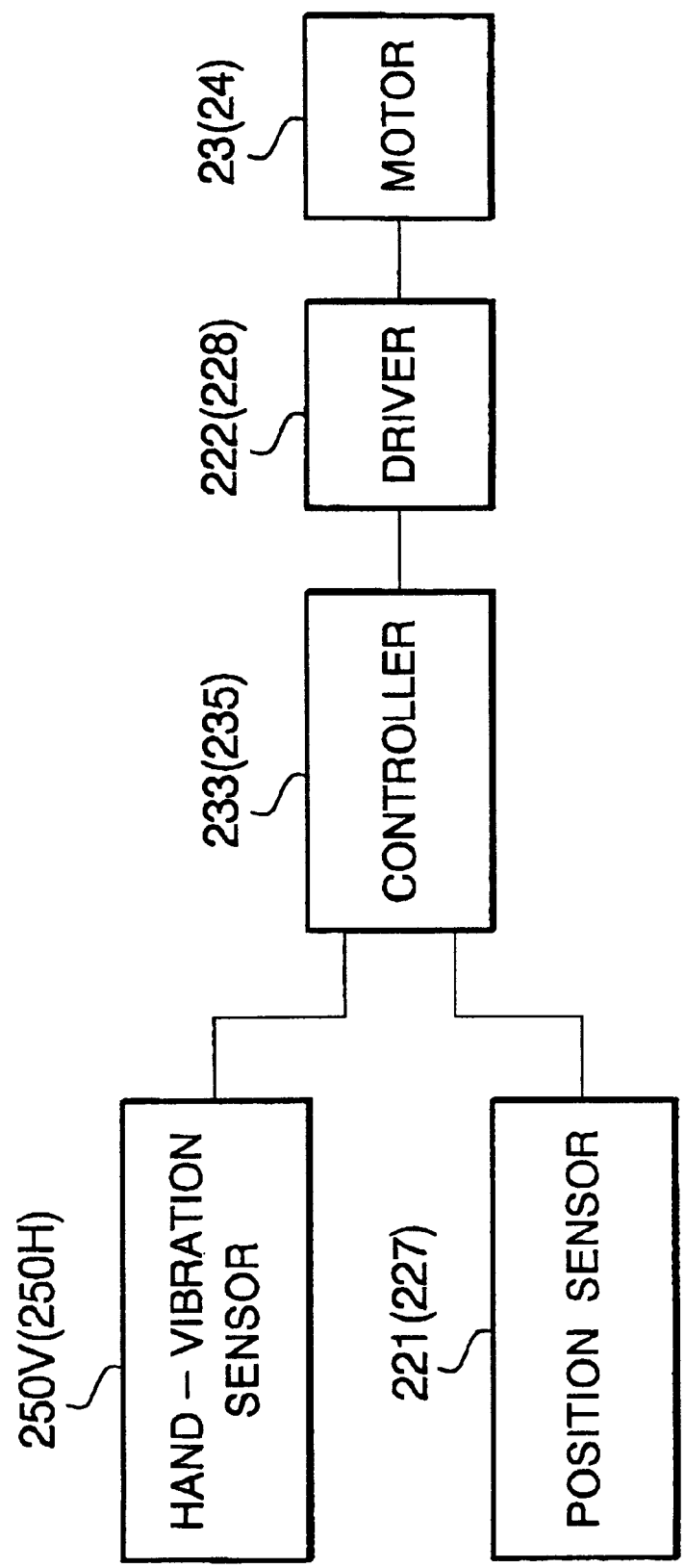
FIG. 4 shows a block diagram illustrating a control system for driving the hand-vibration compensation mechanisms.

Further, as shown in FIG. 4, the up/down compensation mechanism 17 is provided with a hand-vibration sensor 250V for detecting the hand-vibration applied to the binocular 1000 in the up/down direction (i.e., Y-axis direction in FIG. 1). Output signals of the hand-vibration sensor 250V and the position sensor 221 are input to a controller 233. The controller 233 calculates amount of movement in the up/down direction due to the hand-vibration, and controls a driver 222 to drive the motor 23 by an amount corresponding to the amount of movement due to the hand-vibration. Specifically, the controller 233 determines a target position to which the arm 19 is to be positioned for canceling change of the position of the images due to the hand-vibration applied to the binocular 1000 in the up/down direction based on the amount of movement detected by the hand-vibration sensor 250V. Then, the controller 233 controls the driver 222 to move the arm 19 to the calculated target position with monitoring the position detected by the position sensor 221. As the above control is continuously executed, the controller 233 continuously updates the target position, and accordingly, trembling of the images due to the hand-vibration in the up/down direction can be compensated.

Figure 5:
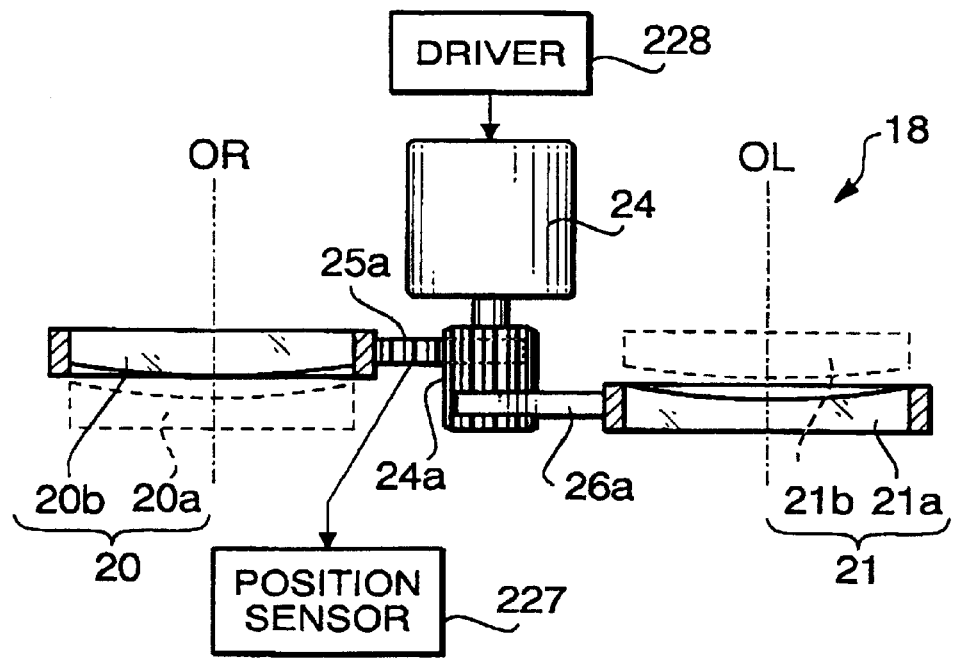
FIG. 5 is a top view showing a schematic structure of a right/left hand-vibration compensation mechanism of the binocular shown in FIG. 1.
Figure 6:
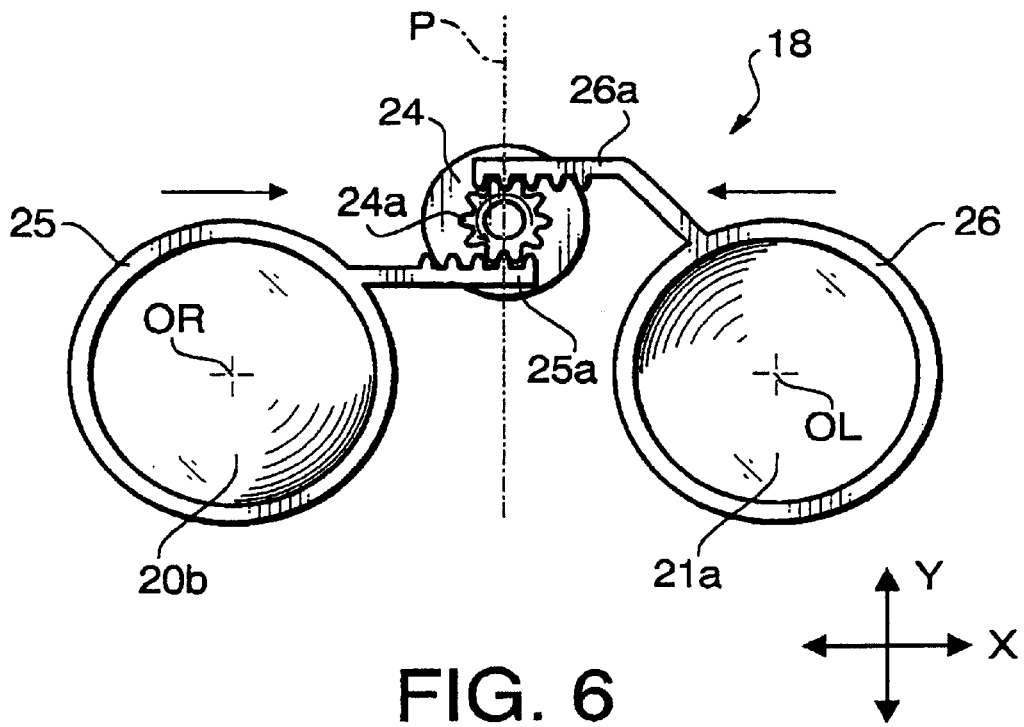
FIG. 6 is a front view showing a schematic structure of the right/left hand-vibration compensation mechanism of the binocular shown in FIG. 1.

A right/left compensation mechanism 18 will be described. As shown in FIGS. 1, 5 and 6, the right/left compensation mechanism 18 is constructed to move the compensation lenses 20b and 21a.

The right/left compensation mechanism 18 has, as shown in FIGS. 5 and 6, a motor 24 on the eyepiece lens side, and to a shaft 24s of the motor 24, a pinion gear 24a is fixed. It should be noted that the shaft 24s extends parallel to the shaft 19, and a plane P including the axes of the shaft 19 and 24s is perpendicular to the plane including the optical axes OR and OL.

As shown in FIG. 6, the positive lens 20b is held by a frame 25, and the negative lens 21a is held by a frame 26. Similar to the up/down compensation mechanism 17, when the positive lens 20b and the negative lens 21a are decentered in the same direction by the same amount, optical paths of the light passed through the positive and negative lenses 20b and 21a are shifted by the same amount, but in the opposite directions.

As shown in FIGS. 5 and 6, from the frame 25, a right rack 25a which engages the pinion gear 24a is projected in the X-axis direction. Similarly, from the frame 26, a left rack 26a which engages the pinion gear 24a is projected. As shown in FIG. 6, engaging portions of the rack 25a and the rack 26a extend in parallel to each other, and are engaged with the pinion gear 24a at opposite sides thereof. When the pinion gear 24a rotates, the frame 25 and the frame 26 move, along the X-axis, in the opposite directions. For example, in FIG. 6, when the pinion gear 24a rotates in the counter-clockwise direction, the frame 25 and frame 26 move towards each other as indicated by arrow, with respect to the center of the optical axes OR and OL, or with respect to the plane P defined therebetween.

Since the positive lens 20b is held by the frame 25, and the negative lens 21a is held by the frame 26, although the frames 25 and 26 move in opposite directions, compensation is made in the same direction along the X-axis. Further, amounts of compensation made by lenses 20b and 21a, when moved by the same amount, are the same.

As shown in FIG. 5, a position sensor 227 is provided to detect a position of the rack 25a with respect to the initial position thereof.

Further, as shown in FIG. 4, the right/left compensation mechanism 18 is provided with a hand-vibration sensor 250H for detecting the hand-vibration of a component in the right/left direction (i.e., X-axis direction in FIG. 1). Output signals of the hand-vibration sensor 250H and the position sensor 227 are input to a controller 235. The controller 235 calculates amount of movement in the right/left direction due to the hand-vibration, and controls a driver 228 to drive the motor 24 by an amount corresponding to the amount of movement due to the hand-vibration. Specifically, the controller 235 determines a target position to which the rack 25a is to be positioned for canceling change of the position of the image due to the hand-vibration based on the amount of movement detected by the hand-vibration sensor 250H. Then, the controller 233 controls the driver 228 to move the rack 25a to the calculated target position with monitoring the position detected by the position sensor 227.

It should be noted that, since the lenses 20b and 21a are moved symmetrically with respect to the center of the optical axes OR and OL (or with respect to the plane P), by controlling the position of the rack 25a, both lenses 20b and 21a can be located at appropriate positions. As the above control is continuously executed, the controller 235 continuously updates the target position, and accordingly, trembling of the image due to the hand-vibration in the right/left direction can be compensated.

Figure 7:
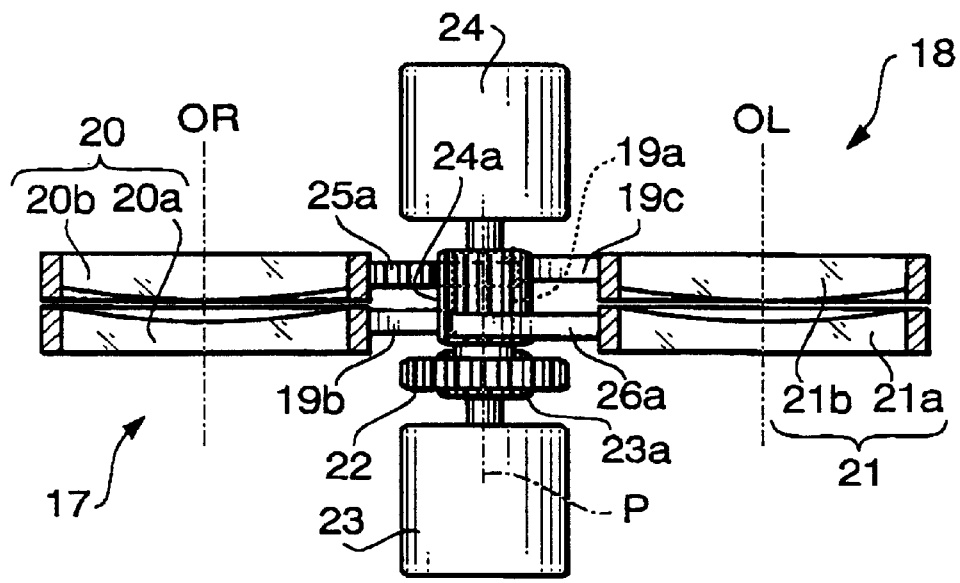
FIG. 7 is a top view showing the up/down and right/left hand-vibration compensation mechanisms of the binocular shown in FIG. 1.
Figure 8:
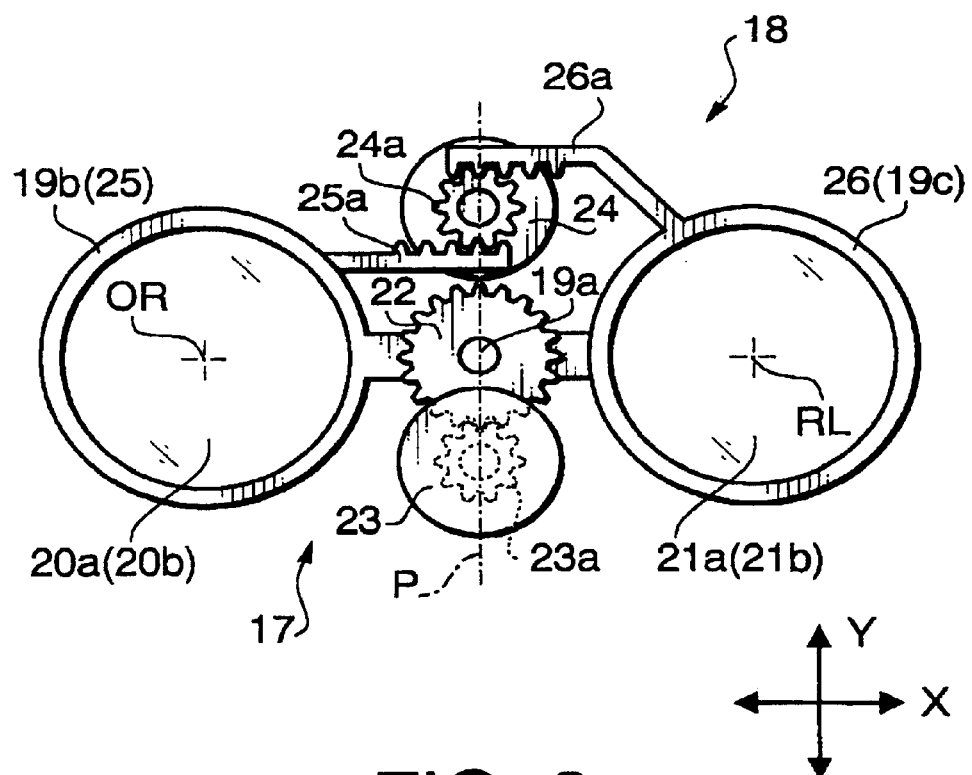
FIG. 8 is a front view showing the up/down and right/left hand-vibration compensation mechanisms of the binocular shown in FIG. 1.

FIG. 7 is a top view of the up/down compensation mechanism 17 and right/left compensation mechanism 18 when both are incorporated in the binocular 1000, and FIG. 8 shows a front view thereof. As shown in FIGS. 7 and 8, all the lenses included in the compensation lenses 20 and 21 are moved for compensating the trembling of images due to the hand vibration. Accordingly, the compensation mechanisms are made relatively compact in size.

Further, since the motors 23 and 24 are arranged at positions between the optical axes OR and OL, a space (room) inside the binocular 1000 can be used efficiently.

Since the up/down compensation mechanism 17 is arranged such that the lenses 20a and 21b rotate about the shaft 19a, if the weight of the lenses 20a and 21b are substantially the same, i.e., the rotation arm 19 is equally balanced at the shaft 19a, movement of the lenses 20a and 21b, (i.e., rotation of the arm 19) will not change the position of the center of gravity, and accordingly, movement of the lenses 20a and 21b will not cause a user of the binocular to feel ill-balanced.

Further, since the lenses 20b and 21a are moved in opposite directions, inertia applied to the lenses 20b and 21a works in opposite directions, and cancel each other. Further, the lenses 20b and 21a are located at the same distance with respect to the center of the pinion gear 24a, when the lenses 20b and 21a are moved, the center of the gravity does not move.

As described above, according to the first embodiment, the compensation lenses 20a and 21b are moved in the opposite directions on a plane perpendicular to the optical axes OR and OL, and further the compensation lenses 20b and 21a are also moved in the opposite directions on a plane perpendicular to the optical axes OR and OL, the center of the gravity of each compensation mechanism is maintained unchanged. Accordingly, the movement of the compensation mechanisms will not cause the user to feel ill-balanced condition when the compensation mechanism operate. Further, when the user intentionally move the binocular (panning and/or tilting), the compensation mechanisms will not operate to resist the movement.

Further, the compensation lenses for the right telescopic system and the compensation lenses for the left telescopic system move symmetrically with respect a commonly owned center of movement, the binocular is equally balanced at the center of the right and left telescopic optical systems.

Furthermore, each of the compensation mechanisms has a relatively simple construction, the compensation mechanisms do not require a large accommodation space, can be made compact in size and inexpensive.

The present invention is directed to part of a binocular that includes hand-vibration sensors, sensors for detecting the position of the compensation lenses, and such elements have thus been shown-generally in FIG. 4. However, the details of the hand-vibration sensors and/or position detection sensors do not form part of the invention. These are provided to assist in understanding of the invention, and any types of suitable hand-vibration sensors and,or position detecting sensors could be employed to control the up/down compensation mechanism and/or the right/left compensation mechanism.

Second Embodiment

Figure 9:
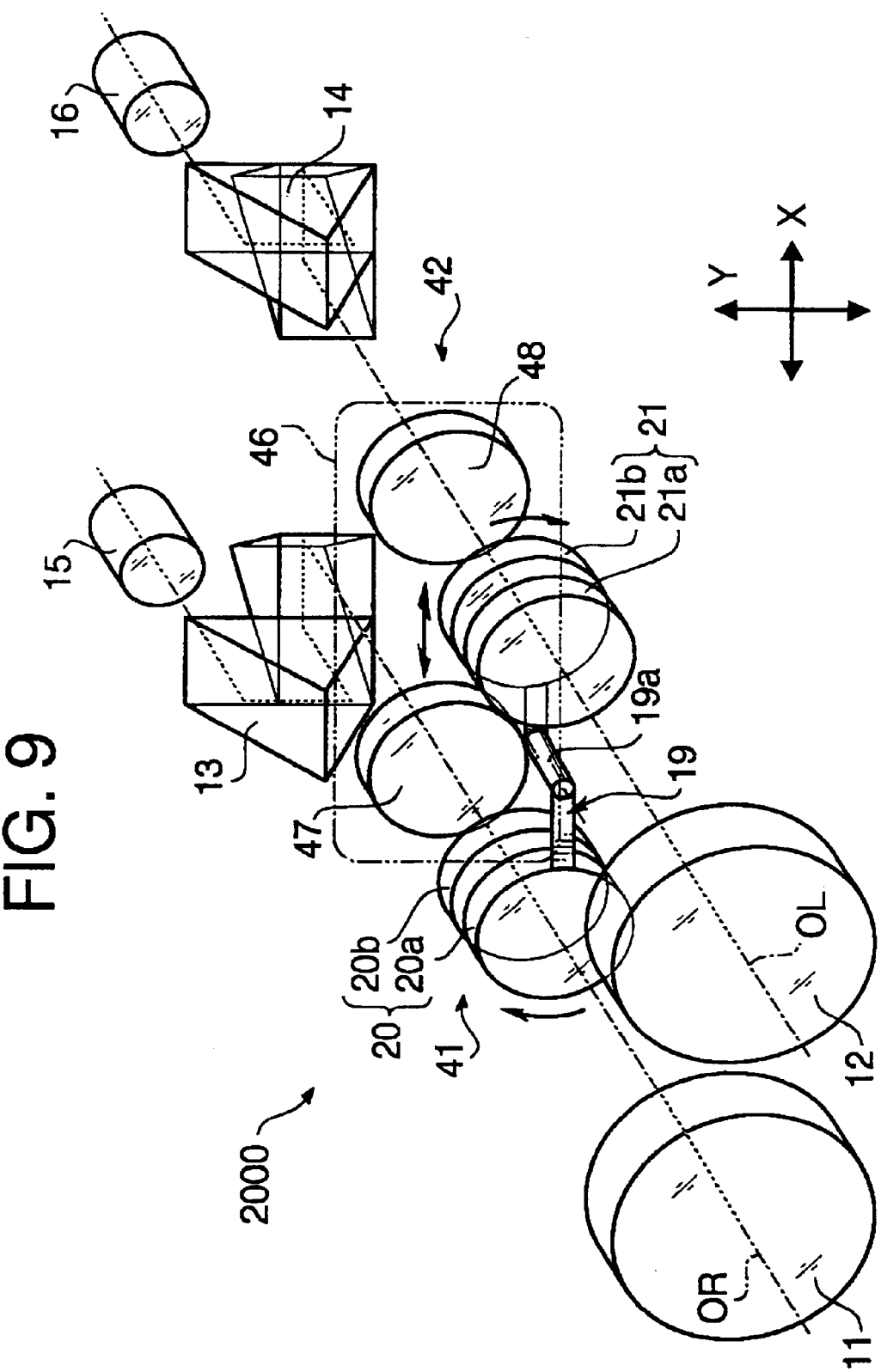
FIG. 9 is a perspective view showing arrangement of optical elements of a binocular according to a second embodiment of the invention.

FIG. 9 is a perspective view of an optical system of a binocular 2000 according to a second embodiment. In the second embodiment, an up/down compensation mechanism 41, which is similar to the up/down compensation mechanism 17 of the first embodiment (see FIGS. 3 and 5), is employed. In the second embodiment, however, the compensation lenses 20b and 21a are fixed (will not be moved) in the body of the binocular 2000. Instead of the right/left compensation mechanism 18 of the first embodiment, a right/left compensation mechanism 42 is employed in the second embodiment.

Figure 10:
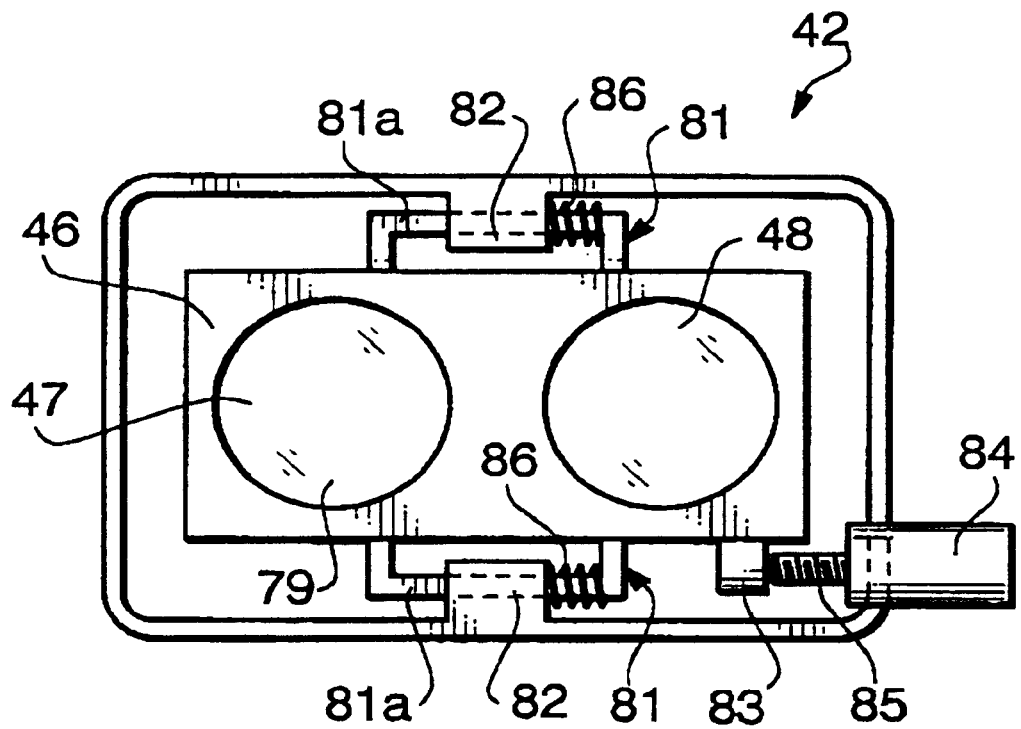
FIG. 10 shows a schematic structure of a right/left compensation mechanism employed in the binocular shown in FIG. 9.

The right/left compensation mechanism 42 is provided between the up/down compensation mechanism 41 and the erecting optical systems 13 and 14. The right/left compensation mechanism 42 has, as shown in FIG. 10, a rectangular lens frame 46 which holds a pair of compensation lenses 47 and 48 at openings formed thereon. The compensation lenses 47 and 48 are provided to intersect the optical axes OR and OL of the right and left telescopic optical systems, respectively. The pair of compensation lenses 47 and 48 are the same lens (either positive or negative lenses). At vertical side ends of the lens frame 46, a pair of guide bars 81 and 81 are provided. Linear slide guide bars 81a and 81a are slidably fitted in through-holes formed in a pair of arms 82 and 82 which are formed inside the body of the binocular 2000. With this structure, the lens frame 46 is movable in the right/left direction (X-axis direction in FIG. 10).

On a side surface of the lens frame 46, a projection 83 is formed. On the body of the binocular 2000, an actuator 84 is provided, and a plunger 85 of the actuator 84 abuts the side surface of the projection 83. The actuator 84 is constituted such that when an electrical power is applied thereto, the plunger 85 protrudes/retracts in the right/left direction in FIG. 10 (i.e., in the X-axis direction). Accordingly, when electrical power is applied to the actuator 84 to make the plunger 85 protrude, the projection 83 is pushed thereby and the lens frame 46 moves toward the left-hand side in FIG. 10.

As shown in FIG. 10, coil springs 86 are provided to the linear slide guide bars 81a and 81a to bias the lens frame 46 to move toward the right-hand side in FIG. 10 with respect to the body of the binocular 2000. Thus, when the actuator 84 is driven so that the plunger 85 protrudes, the lens frame 46 moves toward the left-hand side in FIG. 10, while when the actuator 84 is driven so that the plunger 85 retracts, then due to force of the coil springs 86, the projection 83 is kept contacting the plunger 85, i.e., the lens frame 46 moves toward the right-hand side in FIG. 10. Thus, by driving the actuator 84, the lens frame 46 moves in the X-axis direction.

At the position where the compensation mechanism 42 is provided, the direction of movement of the lenses 47 and 48 coincides with the right/left direction of the inverted images. Therefore, by driving the frame 46 in accordance with the signal indicative of the hand vibration applied to the binocular 2000, in the-right/left direction, trembling of the images due to the hand-vibration in the right/left direction (i.e., X-axis direction) can be compensated, and the observed images stay at the same position in the view of the user.

It should be noted that the control system shown in FIG. 5 may be modified to be applicable to the second embodiment, and accordingly, description and drawings of the control system for the second embodiment are omitted.

Similarly to the first embodiment, according to the second embodiment, the compensation lenses 20a and 21b are moved in the opposite directions on a plane perpendicular to the optical axes OR and OL, the center of the gravity of the compensation mechanism 41 is maintained unchanged. Accordingly, the movement of the compensation mechanism 41 will not cause the user to feel ill-balanced condition when the compensation mechanism operate. Further, when the user intentionally move the binocular (panning and/or tilting), the compensation mechanisms will not operate to resist the movement.

On the other hand, the right/left compensation mechanism 42 moves the lenses 47 and 48 in the same direction, which changes the center of the gravity. However, the center of the gravity changes by a relatively small amount, and the up/down compensation mechanism 41 does not change the position of the center of the gravity, the compensation mechanisms 41 and 42 causes less amount of change of the position of center of the gravity when operating.

Third Embodiment

Figure 11:
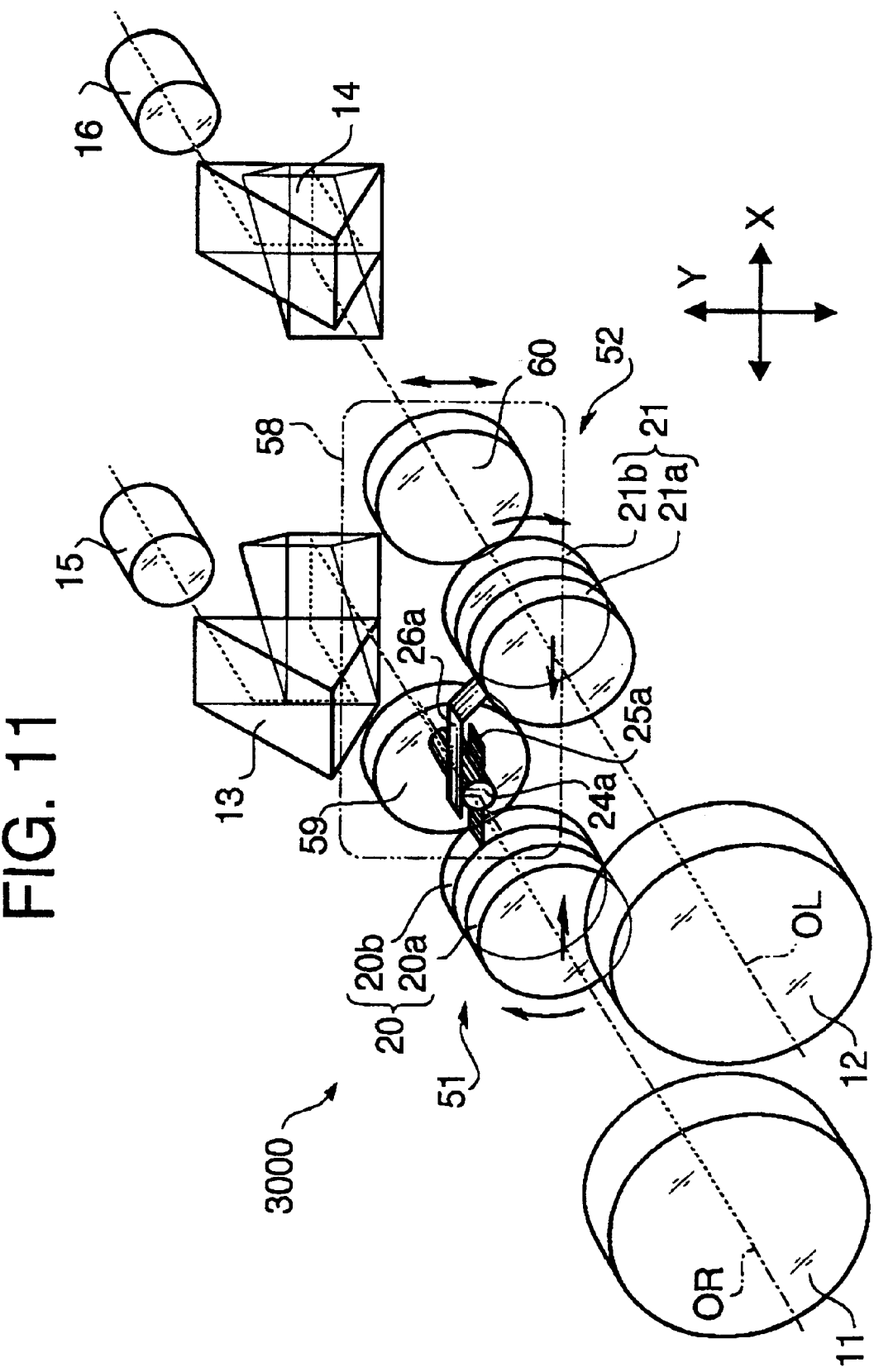
FIG. 11 is a perspective view showing arrangement of optical elements of a binocular according to a third embodiment of the invention.

FIG. 11 is a perspective view of an optical system of a binocular 3000 according to a third embodiment. In the third embodiment, a right/left compensation mechanism 51, which is similar to the right/left compensation mechanism 18 of the first embodiment (see FIGS. 3 and 5), is employed. In the third embodiment, however, the compensation lenses 20a and 21b are fixed (will not be rotated) in the body of the binocular 2000. Instead of the up/down compensation mechanism 17 of the first embodiment, an up/down compensation mechanism 52 is employed in the third embodiment.

Figure 12:
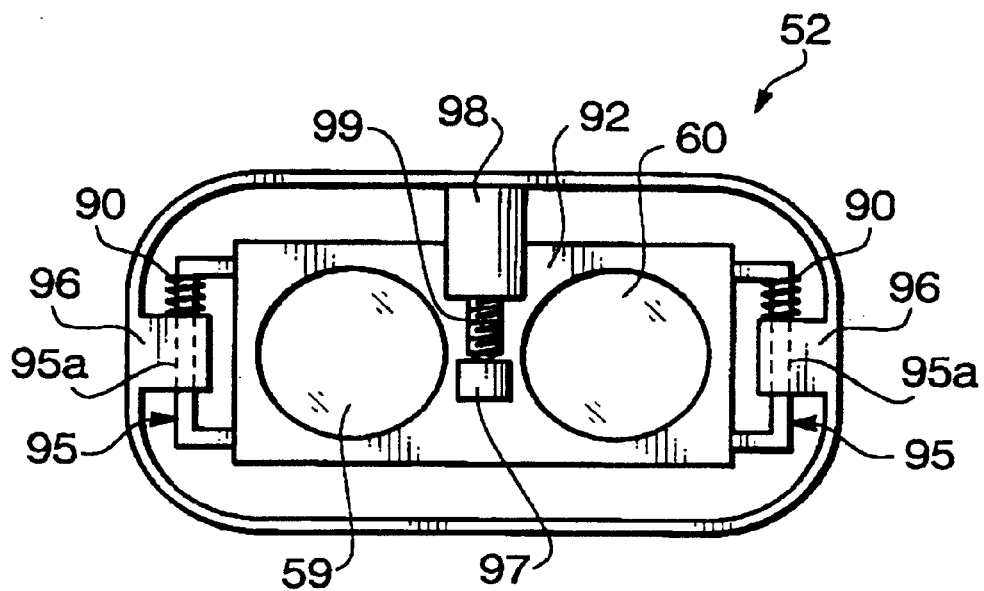
FIG. 12 shows a schematic structure of an up/down compensation mechanism employed in the binocular shown in FIG. 11.

The up/down compensation mechanism 52 is provided between the right/left compensation mechanism 51 and the erecting optical systems 13 and 14. The up/down compensation mechanism 52 has, as shown in FIG. 12, a rectangular lens frame 92 which holds a pair of compensation lenses 59 and 60 at openings formed thereon. The compensation lenses 59 and 60 are provided to intersect the optical axes OR and OL of the right and left telescopic optical systems. The pair of compensation lenses 59 and 60 are the same lens (either positive or negative lenses). As shown in FIG. 12, at longitudinal side ends of the lens frame 92, a pair of guide bars 95 and 95 are provided. Linear slide guide bars 95a and 95a are slidably fitted in through-holes formed in a pair of arms 96 and 96 which are formed inside the body of the binocular. With this structure, the lens frame 92 is movable in a direction perpendicular to a plane including the optical axes OR and OL.

On a surface of the lens frame 92, which is a surface perpendicular to the optical axes OR and OL, a projection 97 is formed between the pair of compensation lenses 59 and 60. On the body of the binocular 3000, an actuator 98 is provided, and a plunger 99 of the actuator 98 abuts the side surface of the projection 97. The actuator 98 is constituted such that when an electrical power is applied thereto, the plunger 99 protrudes/retracts in the up and down direction in FIG. 12. Accordingly, when electrical power is applied to the actuator 98 to make the plunger 99 protrude, the projection 97 is pushed thereby and the lens frame 92 moves in downward direction in FIG. 12.

As shown in FIG. 12, coil springs 90 are provided to the linear slide guide bars 95a and 95a to bias the lens frame 92 in the upward direction in FIG. 12 with respect to the body of the binocular. Thus, when the actuator 98 is driven so that the plunger 99 protrudes, the lens frame 92 moves in downward direction in FIG. 12, while when the actuator 98 is driven so that the plunger 99 retracts, then due to force of the coil springs 90, the projection 97 is kept contacting the plunger 99, i.e., the lens frame 92 moves in the upward direction in FIG. 12. Thus, by driving the actuator 98, the lens frame 92 moves in a direction perpendicular to a plane including the optical axes OR and OL of the right and left telescopic optical systems, that is, in the up/down direction in FIG. 12.

At the position where the compensation mechanism 52 is provided, the direction of movement of the lenses 59 and 60 coincides with the up/down direction of the inverted images. Therefore, by controlling the actuator 98 in accordance with the signal indicative of the hand vibration applied to the binocular 3000, in the up/down direction, trembling of the images due to the hand-vibration in the up/down direction can be compensated.

The up/down compensation mechanism 52 is advantageous when a range of movement of the compensation lenses in the Y-axis direction should be made relatively large. In the compensation mechanism which rotates the right and left compensation lenses, the lenses move along an arc. Therefore, if the compensation amount (i.e., the moving amount) becomes large, displacement of the lenses in the X-axis direction cannot be ignored. In the up/down compensation mechanism 52, the compensation lenses are moved only in the Y-axis direction, and accordingly, compensation amount can be made sufficiently large.

It should be noted that the control system shown in FIG. 5 may be modified to be applicable to the second embodiment, and accordingly, description and drawings of the control system for the second embodiment are omitted.

Since the right/left compensation mechanism 51 moves the lenses 20b and 21a in the opposite directions along the X-axis direction, with respect to the shaft 19a, the center of gravity is not changed by the movement of the lenses 20b and 21a.

On the other hand, the up/down compensation mechanism 52 moves the lenses 59 and 60 in the same direction (i.e., in the Y-axis direction), and therefore the center of the gravity changes by the movement of the lenses 59 and 60. However, the up/down compensation mechanism 52 has a relatively simple structure and can be made light. Therefore, even if a vibration occurs due to operation of the up/down compensation mechanism 52, it results in an ill-balanced feeling that is less than the conventional compensation mechanism.

Modifications

Figure 13:
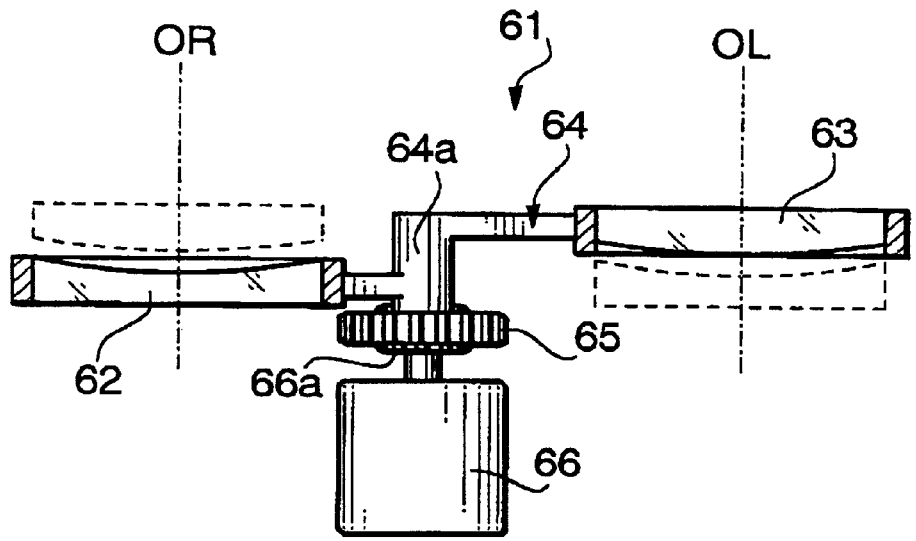
FIG. 13 is a top view showing a schematic structure of a modified hand-vibration compensation mechanism.
Figure 14:
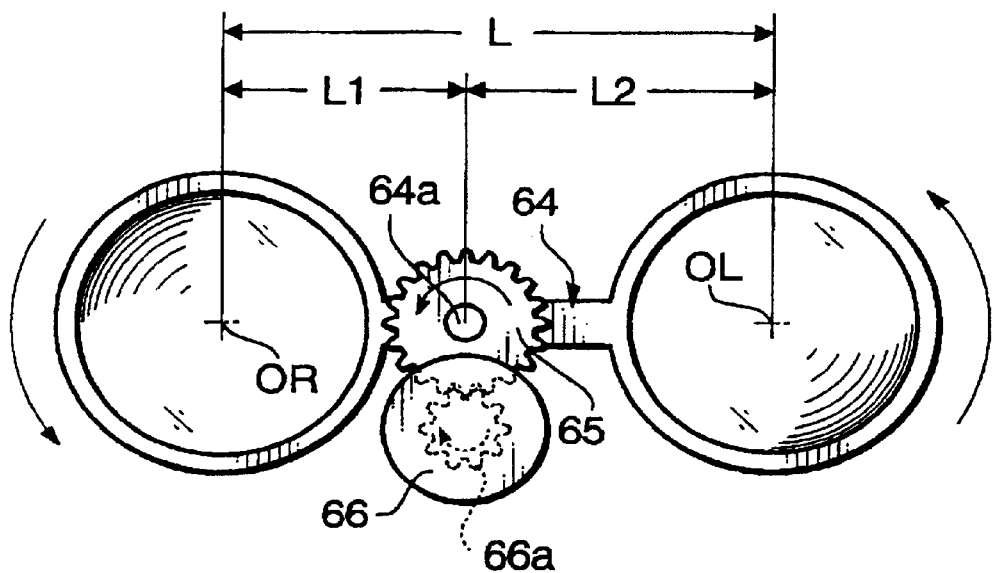
FIG. 14 is a front view showing a schematic structure of the modified hand-vibration compensation mechanism shown in FIG. 13.

In the above-described embodiments, a pair of lenses which are moved in the opposite directions have powers such that the images are shifted by the same amount and in the opposite directions, when the pair of lenses are moved by the same amount. FIGS. 13 and 14 show a modified compensation mechanism 61 which is a modification of the mechanism shown in FIG. 3. The compensation mechanism 61 may be employed in place of any one of the up/down compensation mechanisms described above. The compensation mechanism includes a negative lens 62 and a positive lens 63, optical axes of which coincide with the optical axes OR and OL, respectively, when a rotatable arm 64 is located at its neutral position. In this example, it is assumed that when the lenses 62 and 63 are moved in the opposite directions, by the same amount, images are shifted by K1 and K2, respectively, where, for example, K1:K2=−1.44:1.

In order to make the shifting amount of the images equal, moving amounts of the lenses are determined to be inversely proportional to a ratio of shifting amounts of the images. Thus, as shown in FIG. 14, a length L1 between the center of the negative lens 62 and the axis 64a of the rotation, and a length L2 between the center of the positive lens 63 and the axis 64a are determined such that L1:L2=1:1.44. That is, the distance L between the optical axes OR and OL is divided to satisfy the above condition.

With this structure, when a motor 66 is driven in accordance with the hand-vibration applied to the binocular, the arm 64 is rotated, through a pinion gear 66a and a gear 65, to move the lenses 62 and 63 so that the images are shifted by the same amounts. Accordingly, the trembling of images can be compensated with use of the modified compensation mechanism 61. It should be noted that, if the amounts of movement of the lenses 62 and 63 are represented by D1 and D2, the following condition is satisfied.

K1:K2=D2:D1

It should be noted that, in the above modification, since the arm 64 rotates about the axis 64a at which the arm 64 is not equally balanced. However, the difference of the weights of the lenses 62 and 63 is generally very small, and accordingly, the user may not feel ill-balanced when the arm 64 is rotated.

Optionally, by providing a balancer on the arm 64 or by making the lenses 62 and 63 to have the same weight when manufactured, the arm 64 can be made equally-balanced at the axis 64a, and the well-balanced condition can be obtained.

Figure 15:
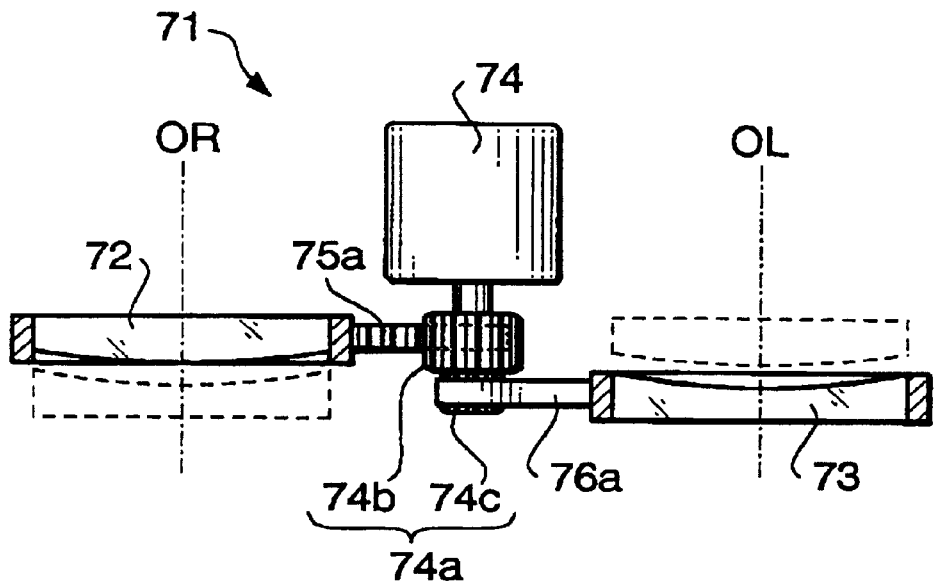
FIG. 15 is a top view showing a schematic structure of another modified hand-vibration compensation mechanism.

FIG. 15 shows a compensation mechanism 71 which is a modification of the compensation mechanism shown in FIG. 6. The compensation mechanism 71 may be employed in place of any one of the right/left compensation mechanisms described above. The compensation mechanism 71 includes a positive lens 72 and a negative lens 73, optical axes of which coincide with the optical axes OR and OL, respectively, when the lenses 72 and 73 are located at their neutral positions. Also in this example, it is assumed that when the lenses 72 and 73 are moved in the opposite directions, by the same amount, images are shifted by K1 and K2, respectively, where K1:K2=1:−1.44.

Figure 16:
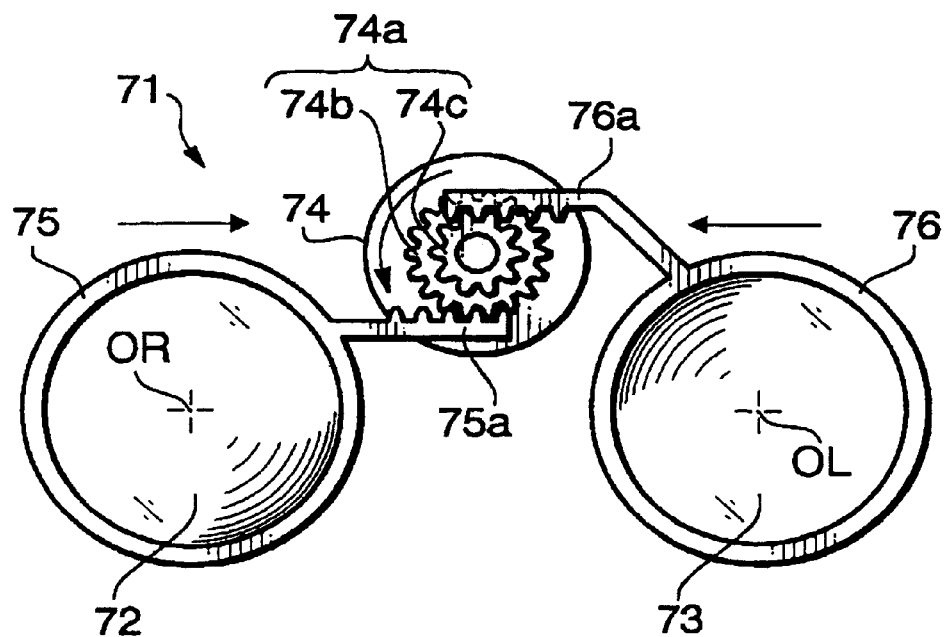
FIG. 16 is a front view showing a schematic structure of the modified hand-vibration compensation mechanism shown in FIG. 15.

The compensation mechanism 71 includes a motor 74, to a rotating shaft of which a double pinion gear 74a is secured. The double pinion gear 74a includes a large gear 74b and a small gear 74c, which are coaxially rotated. In this example, since K1:K2=1:−1.44, a rack 75a which is connected to a frame 75 holding the positive lens 72 is engaged with the large gear 74b, while a rack 76a which is connected to a frame 76 holding the negative lens 73 is engaged with the small gear 74c. A gear ratio of the large gear 74b to the small gear 74c is set to be 1.44. Thus, when the motor 74 is rotated, the frames 75 and 76 approach or apart with respect to the rotation axis of the double pinion gear 74a. Due to the gear ratio indicated above, the amount of movement of the frame 75 is 1.44 times as much as the amount of movement of the frame 76. That is, the positive lens 72 and the negative lens 73 are moved by amounts which are inversely proportional to the ratio of K1 to K2 indicated above. Accordingly, when the motor 74 is driven, the images are shifted by the same amounts in the opposite direction, and therefore, trembling of the images due to the hand vibration applied to the binocular in the right/left direction in FIG. 16 can be compensated.

Alternatively, by changing a pitch of threads of gears respectively engaged with the racks 75a and 76a, the similar effect can be obtained.

It should be noted that, although the above-described embodiments employ eyepiece lenses, they can be replaced with an imaging optical system including an imaging lens and a CCD (Charge Coupled Device) or the like.

According to the present invention, the center of balance is unchanged, or even if changed, change is suppressed, when the compensation mechanism operates. Thus, the invention is not limited to a structure where the compensation mechanisms are provided between the objective optical system and the erecting optical system.

Further, each embodiment described above employs both the up/down and right/left compensation mechanism. The invention is not limited to this configuration, but is applicable to a binocular employing one of the up/down or right/left hand vibration compensation system.

Furthermore, although a pair of lenses which are moved simultaneously to compensate the trembling of the images in the same direction are positive and negative lenses in the embodiments, the type of the lenses should be determined depending on the orientation of images at a position where the compensation mechanism is provided. For example, if the compensation mechanism,is provided at a position where an image of the right telescopic optical system is rotated by 180 degrees with respect to the image of the left telescopic optical system, then by moving the same type of the lenses in the opposite directions, the observed images can be shifted in the same direction.

What is claimed is:

1. A hand-vibration compensation system for compensating trembling of images due to a hand-vibration applied to a binocular having a pair of telescopic optical systems, said hand-vibration compensation system comprising:

first and second compensation optical systems respectively provided in said pair of telescopic optical systems, optical axes of said pair of telescopic optical systems intersect said first and second compensation optical systems, respectively; and a driving system that moves at least one lens included in each of said first and second compensation optical systems in opposite directions within a plane perpendicular to said optical axes of said pair of telescopic optical systems.

2. The hand-vibration compensation system according to claim 1, wherein, when said at least one lens included in said first compensation optical system is moved by a predetermined amount, image is shifted by an amount K1, and when said at least one lens included in said second compensation optical system is moved by a second predetermined amount, image is shifted by an amount K2, and wherein said driving system moves said at least one lens included in said first compensation optical system by an amount L1 and said at least one lens included in said second compensation optical system by an amount L2 such that a relationship:

K1:K2=L2:L1 is satisfied.

3. The hand-vibration compensation system according to claim 1, wherein said driving system comprises:

an arm that is located at a center between said optical axes of said pair of telescopic optical systems, and is rotatable about an axis extending in parallel with said optical axes of said pair of telescopic optical systems, said at least one lens included in each of said first and second compensation optical systems being held at each end of said arm; and an actuator that drives said arm to rotate about said axis in accordance with a hand-vibration applied to said binocular in a direction perpendicular to a plane including both of said optical axes of said first and second telescopic optical systems.

4. The hand-vibration compensation system according to claim 3, wherein each of said first and second compensation optical systems includes another lens, wherein said hand-vibration compensation system includes another driving system that moves said another lens of each of said first and second compensation optical systems in a direction which is parallel to a line perpendicular to both of said optical axes of said first and second telescopic optical systems.

5. The hand-vibration compensation system according to claim 4, wherein said another lens of each of said first and second compensation optical systems is moved in the same direction when the trembling of images due to the hand-vibration applied to said binocular is compensated.

6. The hand-vibration compensation system according to claim 4, wherein said another lens of each of said first and second compensation optical systems is moved in an opposite direction when the trembling of images due to the hand-vibration applied to said binocular is compensated.

7. The hand-vibration compensation system according to claim 1, wherein said driving system comprises:

first and second frames respectively holding said at least one lens of each of said first and second compensation optical systems, said first and second frames being movable in a direction parallel to a line which is perpendicular to both of said optical axes of said first and second telescopic optical systems and is parallel to a plane including said optical axes of said first and second telescopic optical systems; and an actuator that moves said first and second frames in accordance with a hand-vibration applied to said binocular in the direction parallel to the line which is perpendicular to both of said optical axes of said first and second telescopic optical systems and is parallel to a plane including the optical axes of the first and second telescopic optical systems.

8. The hand-vibration compensation system according to claim 7, wherein each of said first and second compensation optical systems includes another lens, wherein said hand-vibration compensation system includes another driving system that moves said another lens of each of said first and second compensation optical systems in a direction perpendicular to a plane including both of said optical axes of said first and second telescopic optical systems.

9. The hand-vibration compensation system according to claim 8, wherein said another lens of each of said first and second compensation optical systems is moved in the same direction when the trembling of images due to the hand-vibration applied to said binocular is compensated.

10. The hand-vibration compensation system according to claim 1, wherein said telescopic optical systems include objective lenses and erecting optical systems, respectively, and wherein said first and second compensation optical systems are provided between said objective lenses and said erecting optical systems.

11. The hand-vibration compensation system according to claim 1, wherein said driving system comprises:

a first driving mechanism, which includes:
(a) an arm that is located at a center between said optical axes of said pair of telescopic optical systems, and is rotatable about an axis extending in parallel with said optical axes of said pair of telescopic optical systems, said at least one lens included in each of said first and second compensation optical systems being held at each end of said arm; and
(b) a first actuator that moves said arm to rotate about said axis in accordance with a hand-vibration applied to said binocular in a direction perpendicular to a plane including said optical axes of said first and second telescopic optical systems; and a second driving mechanism, which includes:
(a) first and second frames respectively holding another optical element of each of said first and second compensation lens groups, said first and second frames being movable in a direction parallel to a line which is perpendicular to both of said optical axes of said first and second telescopic optical systems; and
(b) a second actuator that moves said first and second frames in accordance with a hand-vibration applied to said binocular in a direction parallel to said line which is perpendicular to both of said optical axes of said first and second telescopic optical systems.

12. A binocular having a hand-vibration compensation system for compensating trembling of images due to a hand-vibration applied to said binocular, comprising:

a pair of telescopic optical systems;

first and second compensation optical systems respectively provided in said pair of telescopic optical systems, optical axes of said pair of telescopic optical systems intersect said first and second compensation optical systems, respectively; and a driving system that moves at least one optical element included in each of said first and second lens in opposite directions within a plane perpendicular to said optical axes of said pair of telescopic optical systems.

* * * * *